United States Patent
Okada et al.

(10) Patent No.: US 9,363,696 B2
(45) Date of Patent: Jun. 7, 2016

(54) ANALYZING DEVICE, ANALYZING METHOD, AND ANALYZING PROGRAM

(71) Applicant: FUJITSU LIMITED, Kawasaki-shi, Kanagawa (JP)

(72) Inventors: Sumiyo Okada, Kawasaki (JP); Yuji Nomura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 89 days.

(21) Appl. No.: 14/153,314

(22) Filed: Jan. 13, 2014

(65) Prior Publication Data

US 2014/0198679 A1 Jul. 17, 2014

(30) Foreign Application Priority Data

Jan. 17, 2013 (JP) .................. 2013-006372

(51) Int. Cl.
*H04L 12/26* (2006.01)
*H04W 24/08* (2009.01)
*H04W 24/06* (2009.01)

(52) U.S. Cl.
CPC .............. *H04W 24/08* (2013.01); *H04W 24/06* (2013.01)

(58) Field of Classification Search
None
See application file for complete search history.

(56) References Cited

U.S. PATENT DOCUMENTS

2010/0165864 A1* 7/2010 Yamaguchi et al. .......... 370/252

FOREIGN PATENT DOCUMENTS

| JP | 2008-205651 | 9/2008 |
| JP | 2010-154201 | 7/2010 |

* cited by examiner

*Primary Examiner* — Afshawn Towfighi
(74) *Attorney, Agent, or Firm* — Staas & Halsey LLP

(57) ABSTRACT

An analyzing device includes a memory and a processor coupled to the memory. The processor is configured to receive an acknowledgement from a wireless communication device for each of a plurality of data which is transmitted through a wired network and transmitted to the wireless communication device by a wireless communication which is capable of retransmitting data, from the wired network, calculate a reception interval of the plurality of acknowledgements, and analyze a retransmission cycle in the wireless communication based on a difference of the calculated reception interval of the plurality of acknowledgements.

12 Claims, 18 Drawing Sheets

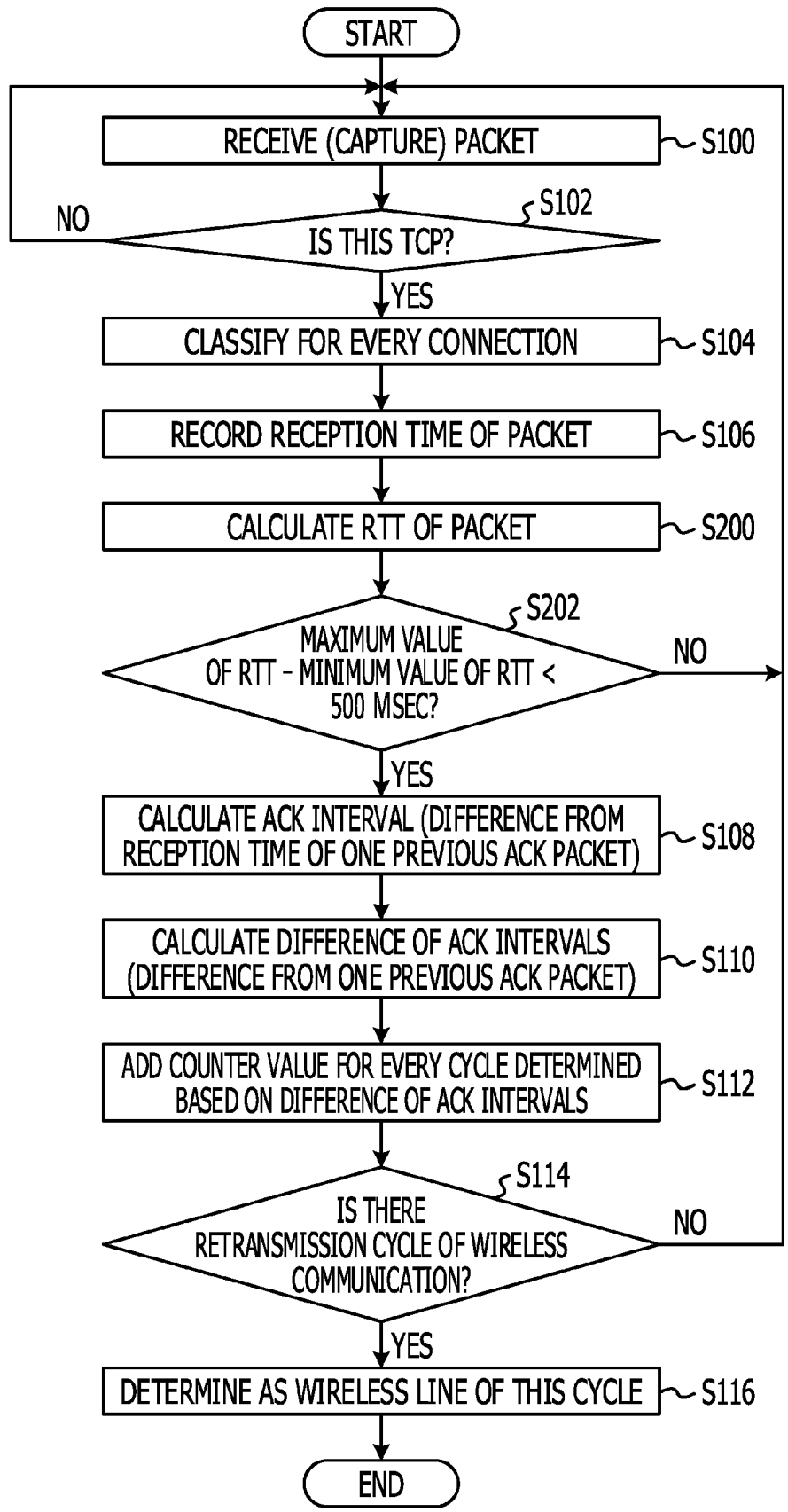

ANALYZING DEVICE, ANALYZING METHOD, AND ANALYZING PROGRAM

CROSS-REFERENCE TO RELATED APPLICATION

This application is based upon and claims the benefit of priority from the prior Japanese Patent Application No. 2013-006372 filed on Jan. 17, 2013, the entire contents of which are incorporated herein by reference.

FIELD

The present disclosure relates to an analyzing device, an analyzing method, and an analyzing program.

BACKGROUND

Recently, a bi-directional communication through a packet communication network is actively performed as information technology is developed. In the packet communication network, communication data is packetized and transmitted based on an Internet standard protocol such as transmission control protocol/Internet protocol (TCP/IP). See, for example, Japanese Laid-open Patent Publication No. 2010-154201. As the amount of data communication through the packet communication network increases, it becomes more important for a service provider who provides a data communication service to monitor and manage the quality of data communication.

SUMMARY

According to an aspect of the invention, an analyzing device includes a memory and a processor coupled to the memory. The processor is configured to receive an acknowledgement from a wireless communication device for each of a plurality of data which is transmitted through a wired network and transmitted to the wireless communication device by a wireless communication which is capable of retransmitting data, from the wired network, calculate a reception interval of the plurality of acknowledgements, and analyze a retransmission cycle in the wireless communication based on a difference of the calculated reception interval of the plurality of acknowledgements.

An object and advantage of the present disclosure is implemented and achieved by elements particularly indicated in claims and a combination thereof.

It is to be understood that both the descriptions described above and the descriptions to be described below are illustrative and explanatory, but not intended to limit the present disclosure as in the claims.

BRIEF DESCRIPTION OF DRAWINGS

FIG. 15 is a flowchart illustrating an analysis processing according to a second embodiment.

DESCRIPTION OF EMBODIMENTS

Figure 1:
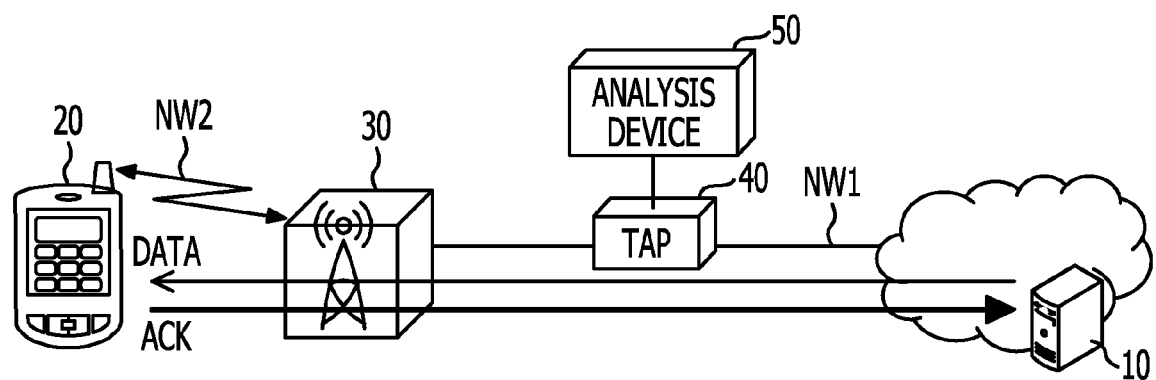
FIG. 1 is a diagram illustrating an example of a network configuration according to an embodiment.

When a wireless section is included in a packet communication network, a wireless communication with a wireless communication device is established. In this case, data transmission may be delayed due to the wireless communication.

However, if the wireless section is monitored to specify a delay caused by the wireless section of the packet communication network, a monitoring point needs to be provided for every wireless communication device. In this case, an installation location of an analyzing device is restricted and the number of installed analyzing devices is increased, which is not reasonable.

Accordingly, one of the aspects of the present disclosure is to analyze the data transmission in the wireless communication based on data received in a wired section.

Hereinafter, embodiments of the present disclosure will be described with reference to the accompanying drawings. Further, in the specification and drawings, components which have substantially the same functional configurations are denoted by the same reference numerals and a redundant description thereof will be omitted.

FIG. 1 is a diagram illustrating an example of a network configuration according to an embodiment of the present disclosure. In FIG. 1, a server 10 and a relay device 30 are coupled through a wired network NW1. The relay device 30 and a wireless terminal 20 are coupled through a wireless network NW2. A section between the server 10 and the relay device 30 is a wired section and a section between the relay device 30 and the wireless terminal 20 is a wireless section. In the wired section, an analyzing device 50 is provided with a TAP 40 interposed therebetween. An example of the wired network NW1 includes a network such as a local area network (LAN), a wide area network (WAN), or the Internet. An example of the wireless network NW2 includes a third generation (3G) mobile network.

The server 10 packetizes data in accordance with an Internet standard protocol such as a transmission control protocol/

Internet protocol (TCP/IP) and transmits the data through the wired network NW1 as a packet communication. The server 10 is, for example, a device operated by a service provider who provides a data communication service.

The relay device 30 performs communication between the server 10 and the wireless terminal 20. The relay device 30 receives data which is transmitted from the server 10 and transmits the data to the wireless terminal 20 through the wireless network NW2. An example of the relay device 30 may include a base station device, a RNC (Radio Network Controller) device, a gateway device, or a router.

A data loss or a bit error may occur more easily in the wireless section than in the wired section. Therefore, the relay device 30 has a data retransmitting function generally and retransmits data of a packet in which the data loss or the bit error occurred for which data needs to be transmitted to the wireless terminal 20.

The wireless terminal 20 wirelessly communicates with the relay device 30 to receive a data packet ("a DATA packet") from the relay device 30. In accordance with the TCP/IP communication protocol, the wireless terminal 20 transmits an acknowledgement packet ("an ACK packet") upon receiving the DATA packet. The relay device 30 sends the ACK packet transmitted from the wireless terminal 20, to the server 10.

The wireless terminal 20 may be a mobile phone or a smart phone having a wireless communication function. The wireless terminal 20 is an example of a wireless communication device. Another example of the wireless communication device may include a personal computer (PC) or an IP phone which has a wireless communication function.

The TAP 40 is a device (network tap) which branches a signal transmitted through the wired network NW1 to the analyzing device 50.

The analyzing device 50 receives data on the wired network NW1 based on the signal branched by the TAP 40. In FIG. 1, the analyzing device 50 receives the DATA packet transmitted from the server 10 and the ACK packet corresponding to the DATA packet. The analyzing device 50 analyzes a retransmitting cycle in the wireless communication based on the received packets. The analyzing device 50 determines a type of wireless line or estimates which one of the wired section and the wireless section has a higher possibility of failure, from the analysis result. If the data on the wired network NW1 is received (captured), the analyzing device 50 may not use the TAP 40.

When a wireless section is included in a packet communication network, a wireless communication is performed with a wireless communication device (e.g., the wireless terminal 20 in the present embodiment). In this case, data transmission may be delayed due to the wireless communication. For example, in FIG. 2, when a DATA packet 2 (DATA2) needs to arrive at the wireless terminal 20 with a predetermined interval after the DATA packet 1 (DATA1) arrives at the wireless terminal 20, the DATA2 is lost in the wireless section. Therefore, the relay device 30 retransmits the DATA2 twice (i.e., the number of retransmissions is two).

In this case, a timing of the wireless terminal 20 of returning the ACK packet is delayed by a time obtained by multiplying the number of retransmissions and a retransmission delay (a time taking for retransmission). Therefore, the retransmission delay in the wireless communication is obtained by a difference between an interval of reception timings of DATA1 and DATA2 (hereinafter, an interval of reception timings of DATA packets is referred to as a DATA interval) and an interval of reception timings of an ACK packet 1 (ACK1) and an ACK packet 2 (ACK2) (hereinafter, an interval of reception timings of ACK packets is referred to as an ACK interval), thereby analyzing a retransmitting cycle in the wireless communication.

Figure 2:
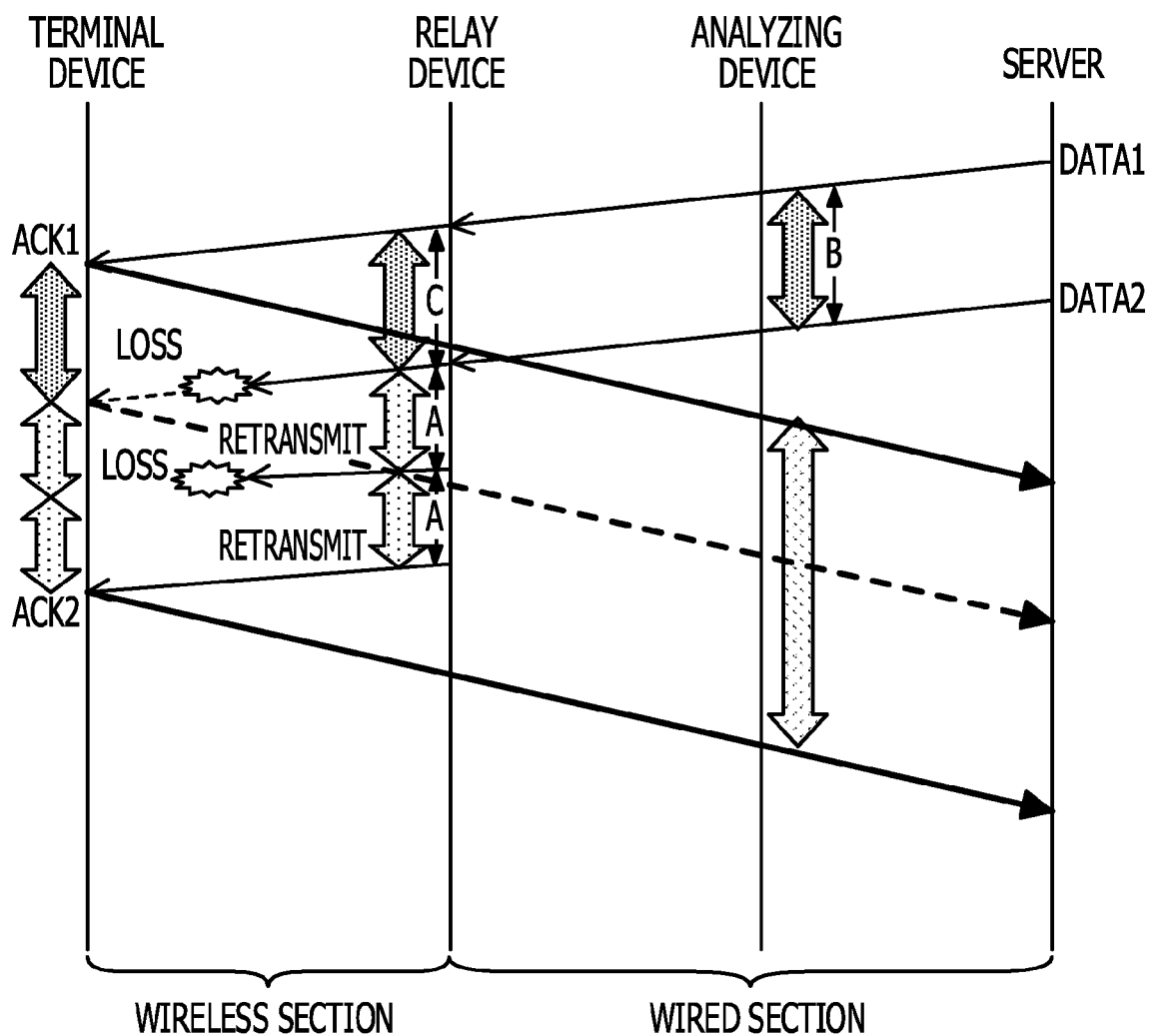
FIG. 2 is a diagram illustrating a data transmission example according to an embodiment.

The data loss or bit error occurs in the wireless section more frequently than in the wired section so that the state of the wireless communication may be analyzed based on a unique retransmitting cycle of the wireless communication. The retransmitting cycle in the wireless communication, as illustrated in FIG. 2, is analyzed by considering that the retransmission delay is an integrally multiple of the retransmitting cycle A when the same data is retransmitted one or more times.

The retransmitting cycle in the wireless communication is known in advance for each type of wireless line. For example, a retransmitting cycle of the long term evolution (LTE) is set to be 8 ms and a retransmitting cycle of the high-speed downlink packet access (HSDPA) is set to be 10 ms. Therefore, when a method which calculates a difference between the DATA interval and the ACK interval and analyzes the retransmitting cycle in the wireless communication based on the calculated value is used for a plurality of packets, the type of wireless lines may be determined.

In the meantime, the data communication in the wireless section is slower and takes more time to transmit the data than in the data communication in the wired section. Therefore, a serialization delay occurs in the slower wireless section until data is loaded in the wireless network NW2 to start a transmission.

However, in the above analyzing method, the serialization delay is not considered. Therefore, in the above analyzing method, it is assumed that the data interval B of DATA1 and DATA2 at the time of being obtained in the analyzing device 50 and the DATA interval C of DATA1 and DATA2 which are transmitted from the relay device 30 to the wireless section are the same. Actually, influence of the serialization delay is large in the slow wireless section so that the DATA interval B and the DATA interval C are different from each other. Therefore, if the retransmitting cycle in the wireless communication in which the serialization delay is considered is analyzed on the assumption that the DATA interval B is different from the DATA interval C, an analysis result having higher accuracy is highly likely to be obtained. As a result, the analyzing device 50 according to the present embodiment of analyzes the retransmitting cycle in the wireless communication in consideration of the serialization delay.

Prior to describing about a specific analyzing method, the "serialization delay" will be described briefly with reference to FIGS. 3 and 4.

Figure 3:
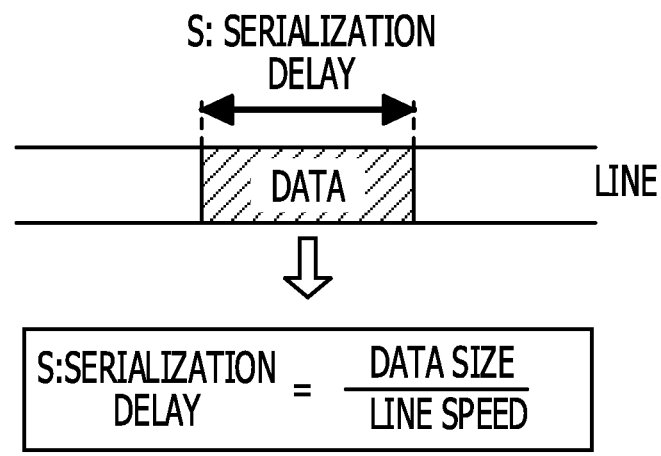
FIG. 3 is a diagram illustrating the delay of serialization at the time of transmitting data.

As illustrated in FIG. 3, the "serialization delay" is a time taking to load arbitrary data in a line and represented by the following Equation (1).

$$\text{Serialization delay} = \text{data size}/\text{line speed} \quad (1)$$

Figure 4:
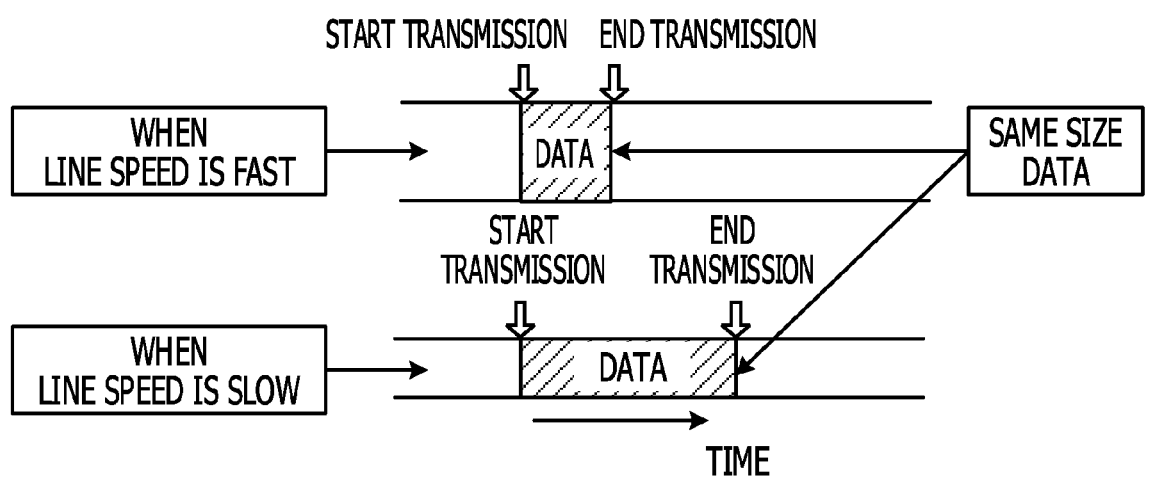
FIG. 4 is a diagram illustrating a relationship between a line speed and data transmission.

FIG. 4 illustrates the relationship between a line speed and data transmission. When the same size data is transmitted, the data transmission time is relatively short if the line speed is relatively fast, and the data transmission time is relatively long if the line speed is relatively slow. That is, when the same size data is transmitted, the transmission time of a relatively slow transmission path (line) is longer than the transmission time of a relatively fast transmission path. For example, in the wired line, the data may be transmitted at approximately 100 Mbps so that if the data size is 1500 bytes, the serialization delay becomes 120 µs (1500 bytes/100 Mbps) from the Equation (1).

In the meantime, the data may be transmitted at approximately 1 Mbps in the wireless line so that if the data size is 1500 bytes, the serialization delay becomes 12 ms (1500 byte/1 Mbps) from Equation (1).

That is, when the transmission speed of the wireless line is ¹⁄₁₀₀ of the transmission speed of the wired line, the serialization delay occurring in the wireless line is 100 times the serialization delay occurring in the wired line. When the data transmitted through the wired network NW1 of FIG. 1 is transmitted to the wireless terminal 20 by the relay device 30, the transmission path of the data is switched from the wired network NW1 into the wireless network NW2. In this case, the data is transmitted through a high speed section (wired section) of approximately 100 Mbps and then transmitted through a low speed section (wireless section) of approximately 1 Mbps. Therefore, a time to load the data which arrives at the relay device 30 in the wireless network NW2 in order to start data transmission, that is, serialization delay occurs in the wireless section.

Figure 5:
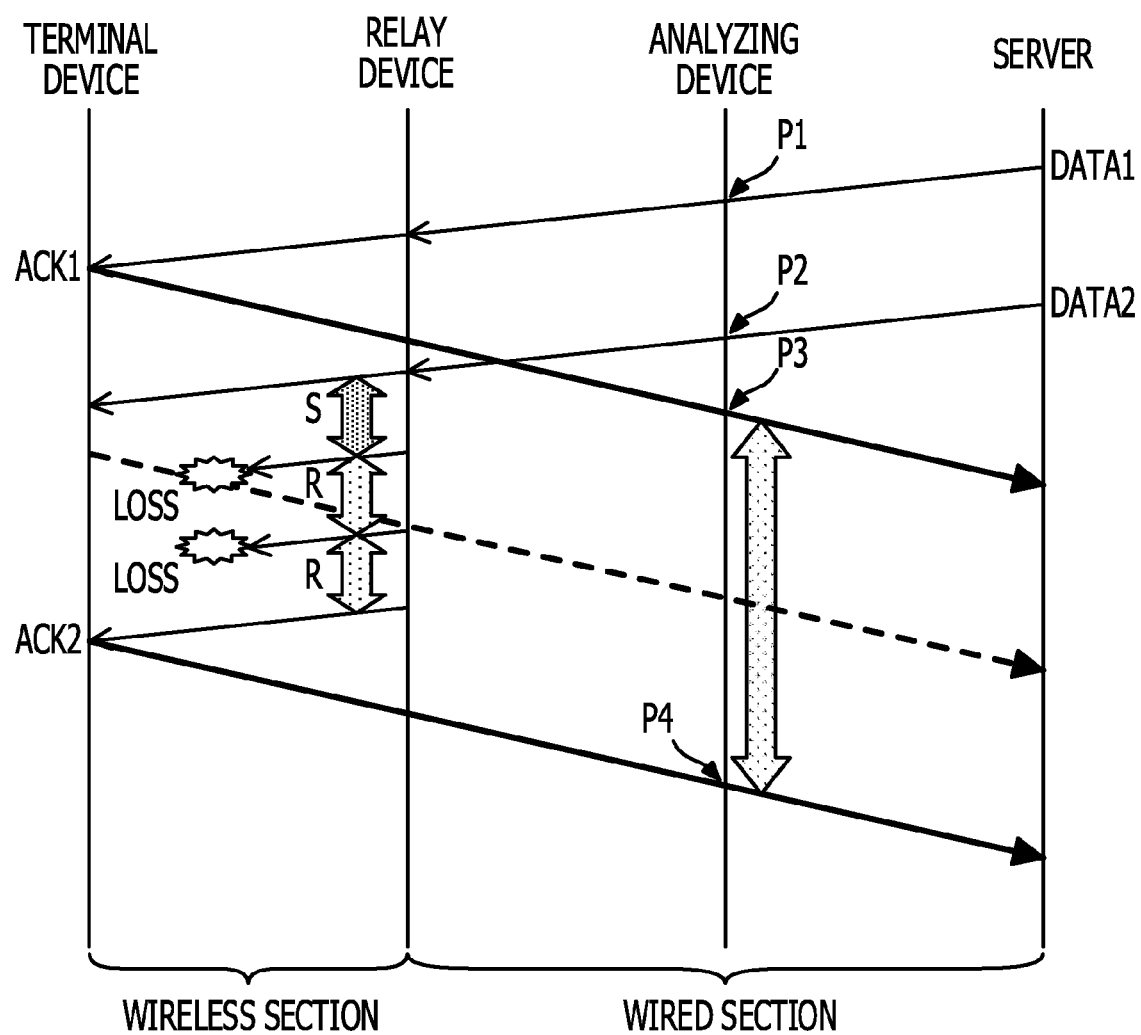
FIG. 5 is a diagram illustrating a data transmission example in consideration of serialization delay according to an embodiment.

As described above, the serialization delay until the data is loaded in a slow wireless network NW2 is considerably longer than the serialization delay which occurs in the wired section. Therefore, as illustrated in FIG. 5, due to the influence of the serialization delay S which occurs in the wireless section, the ACK interval is a time obtained by adding the serialization delay S of the data to a time which is obtained by multiplying the number of transmissions (here, two times) and the retransmission delay R.

As described above, the serialization delay significantly affects the low speed section of the network so that the retransmitting cycle in the wireless communication needs to be analyzed in the wireless section in consideration of the serialization delay. Accordingly, the analyzing device 50 according to the embodiments which will be described below performs analysis in consideration of the serialization delay. By doing this, the accuracy in the analysis of the retransmitting cycle in the wireless communication increases so that the accuracy of determining the type of wireless line may be improved.

First Embodiment

Functional Configuration of Analyzing Device

Figure 6:
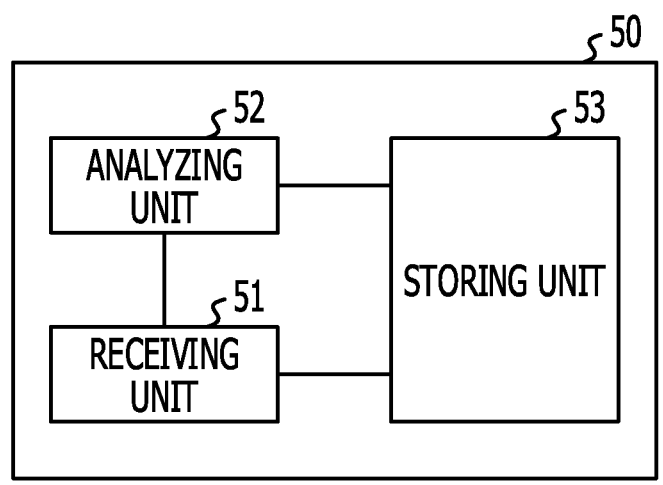
FIG. 6 is a diagram illustrating a functional configuration example of an analyzing device according to first and second embodiments.

The functional configuration of the analyzing device 50 according to a first embodiment of the present disclosure will be described first with reference to FIG. 6. FIG. 6 is a functional configuration diagram of the analyzing device according to the first embodiment.

The analyzing device 50 includes a receiving unit 51, an analyzing unit 52, and a storing unit 53.

The receiving unit 51 sequentially receives a plurality of data which is transmitted through a wired network NW1. The receiving unit 51 receives the data by a network card based on a signal which is branched from the TAP 40 on the wired network NW1. The receiving unit 51 may receive data from a mirror port of a switch on the wired network NW1. In FIG. 5, the receiving unit 51 receives DATA1 at a point P1 and receives DATA2 at a point P2.

The receiving unit 51 receives ACK packets (ACK1, ACK2, . . . ) from a wireless terminal 20 for a plurality of data (DATA1, 2, . . . ) transmitted to the wireless terminal 20 by the relay device 30 through a wireless network NW2. In FIG. 5, the receiving unit 51 receives ACK1 at a point P3 and receives ACK2 at a point P4.

Figure 7A:
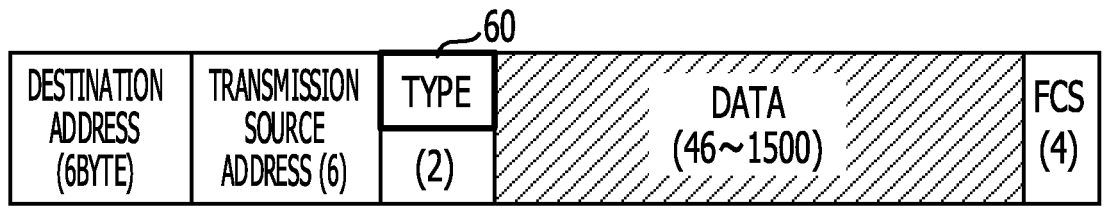
FIGS. 7A and 7B are diagrams illustrating an example of header information.

The analyzing unit 52 extracts data (hereinafter, referred to as "target data") which is an analysis target from data which is received by the receiving unit 51, and classifies the target data for every connection. The analyzing unit 52 extracts the target data based on the header information of the received data. For example, the analyzing unit 52 searches for an Ethernet (registered trademark) header which is illustrated in FIG. 7A, and if a "type" field 60 is "0080", the analyzing unit 52 determines the data as an IPv4 packet and considers the data as target data. Further, the analyzing unit 52 searches for an IP header which is illustrated in FIG. 7B, and if a "protocol" field 61 is "6", the analyzing unit 52 determines the data as a TCP packet and considers the data as a target data.

Figure 7B:
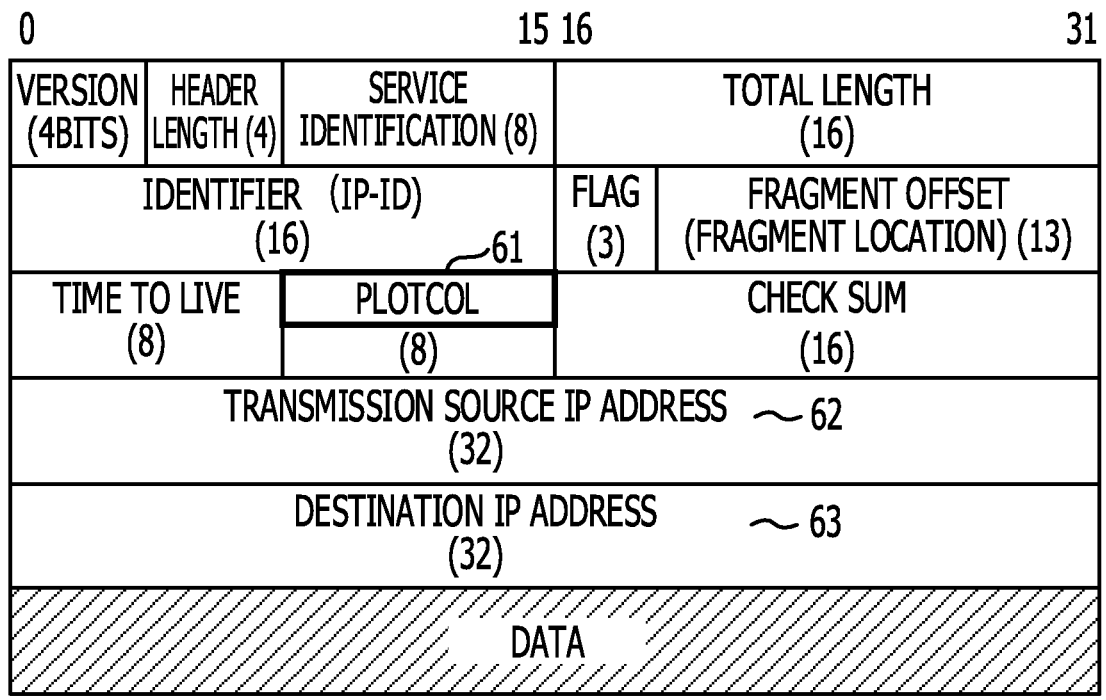
Figure 8:
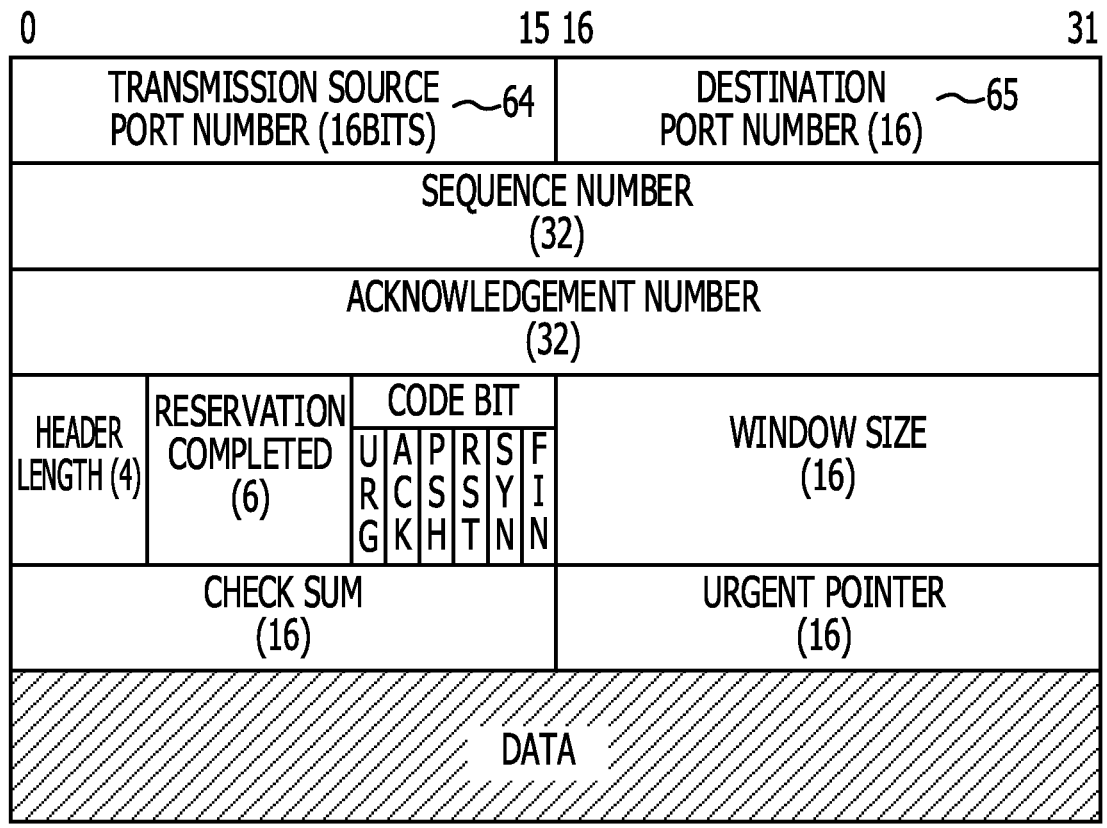
FIG. 8 is a diagram illustrating an example of header information.

The analyzing unit 52 specifies a connection of the target data by the combination of a transmission source IP address 62 and a destination IP address 63 of the IP header illustrated in FIG. 7B, and a transmission source port number 64 and a destination port number 65 of a TCP header illustrated in FIG. 8. The analyzing unit 52 classifies the target data for every connection. As described above, in the present embodiment, data (packet) having a header which is defined in the TCP becomes a target data.

The connection refers to a series of exchanges until the communication ends after the communication between communication entities starts, or refers to a unit for distinguishing the exchanges. For example, in FIG. 5, the connection refers to a series of exchanges until the DATA packet is transmitted to the wireless terminal 20 via the relay device 30 after the communication starts in the server 10 and the ACK packet for acknowledgement returns to the server 10 to end the communication, and which is classified as the same connection.

The analyzing unit 52 obtains a reception time of the data received by the receiving unit 51 using a timer (clock) of the analyzing device 50.

The analyzing unit 52 calculates the ACK interval from the reception time of the data received by the receiving unit 51.

The storing unit 53 stores the reception time of the data obtained by the analyzing unit 52 and the calculated ACK interval.

The analyzing unit 52 analyzes the retransmitting cycle in the wireless communication based on a difference of a plurality of calculated ACK intervals.

The analyzing unit 52 determines the type of the wireless line based on the analysis result of the retransmitting cycle in the wireless communication.

[Operation of Analyzing Device]

Figure 9:
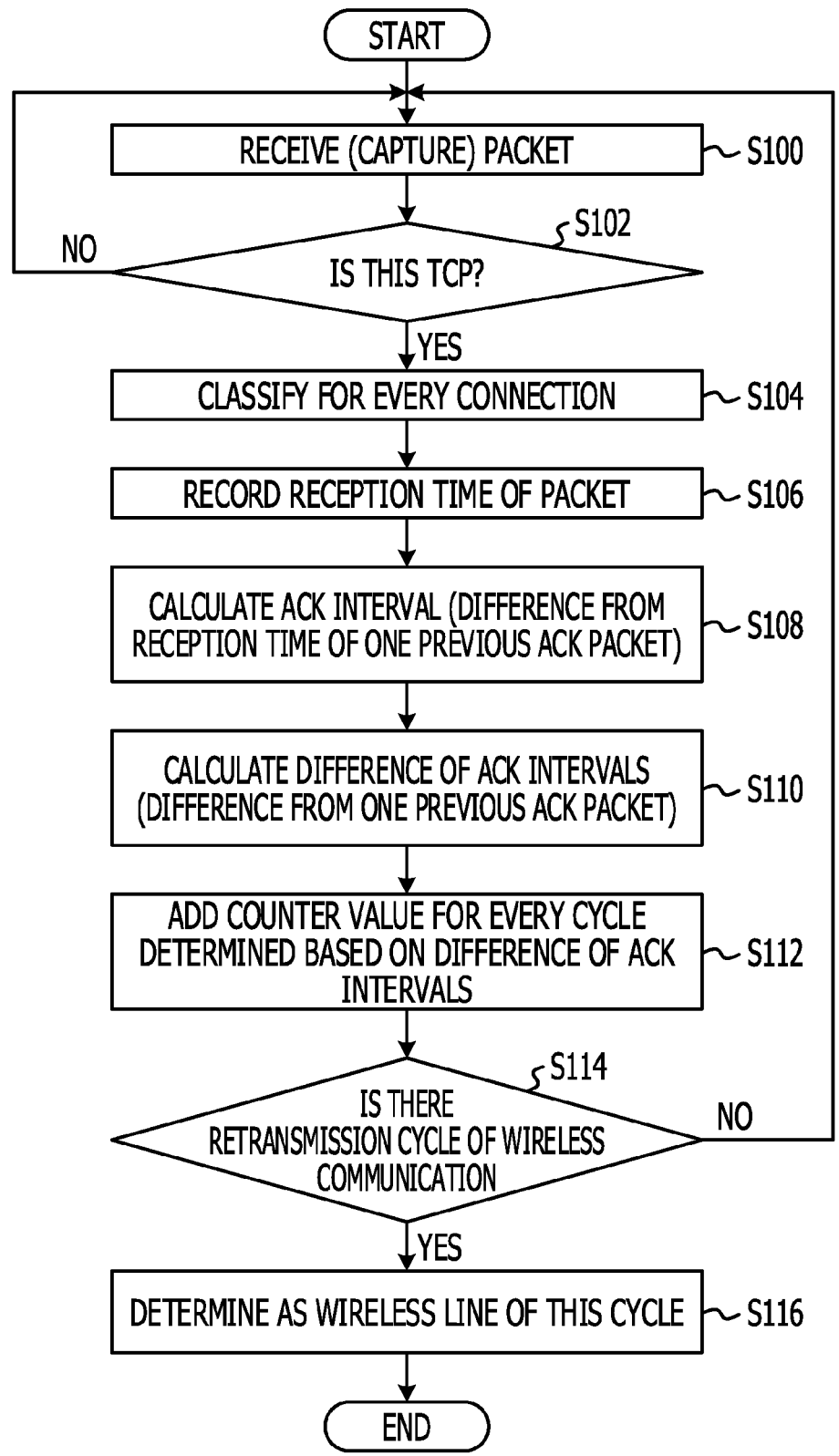
FIG. 9 is a flowchart illustrating an analysis processing according to a first embodiment.
Figure 10:
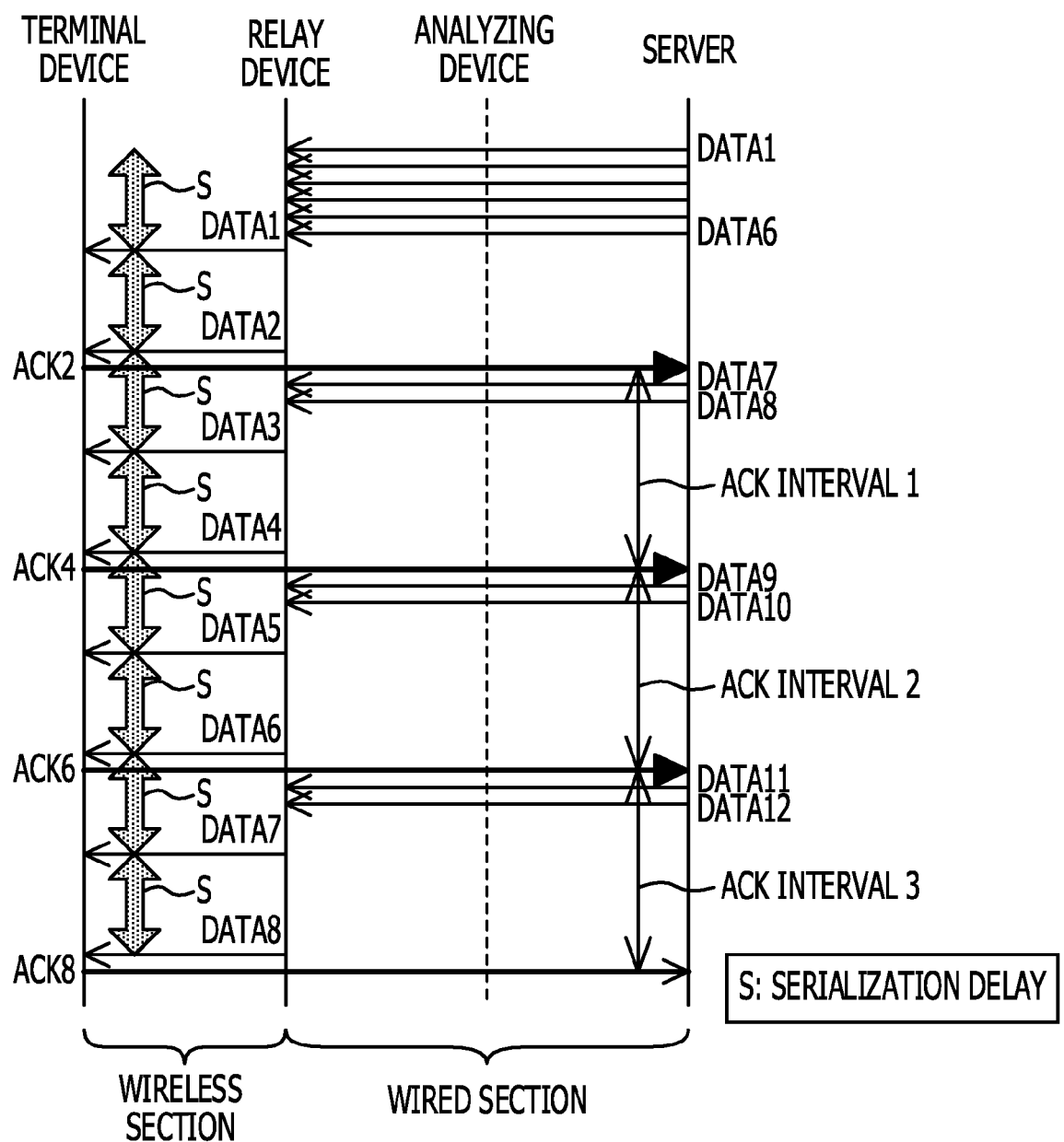
FIG. 10 is a diagram illustrating an analysis processing according to the first embodiment.
Figure 11:
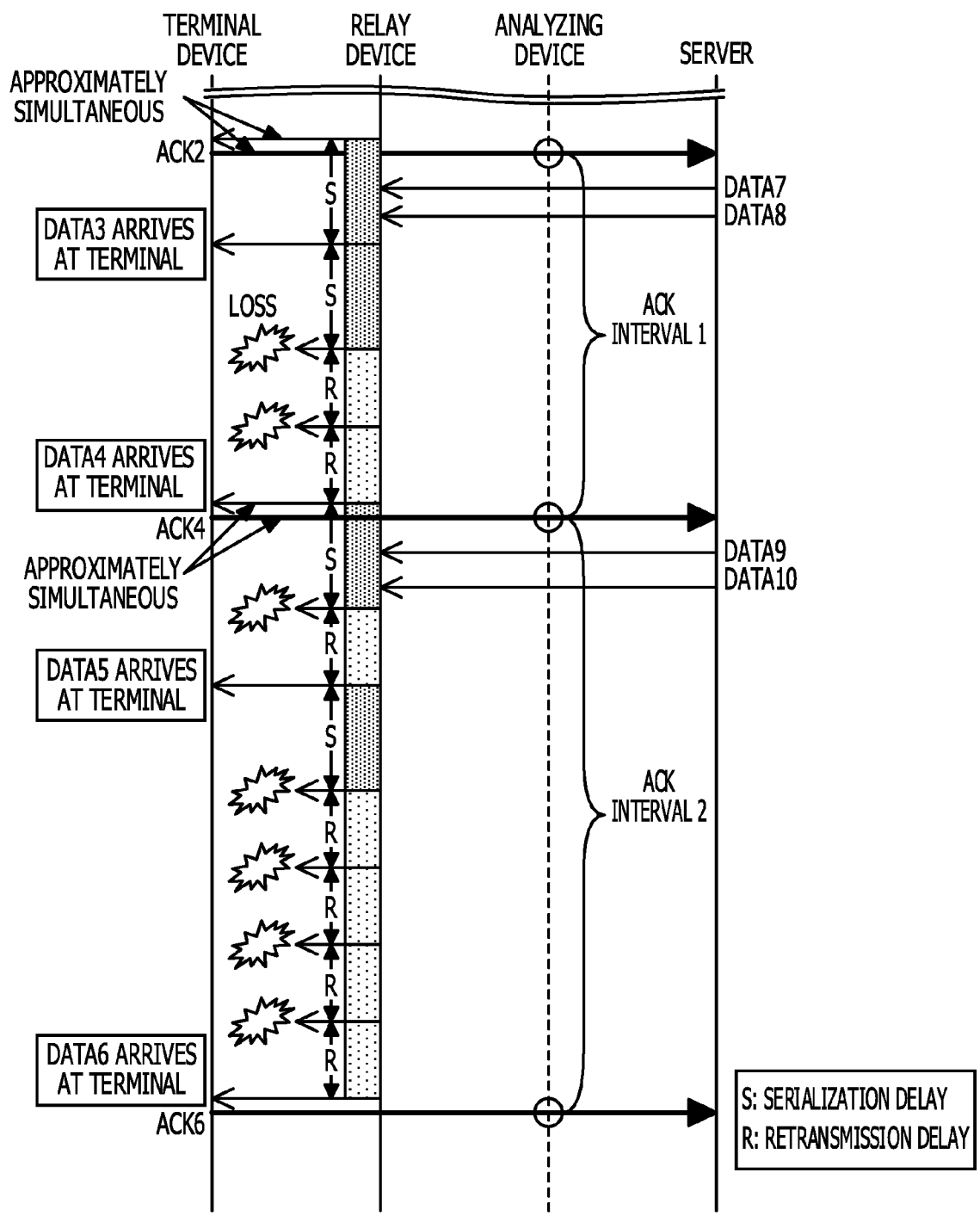
FIG. 11 is a diagram illustrating a specific example of an analysis processing according to the first embodiment.

The operation of the analyzing device 50 according to the present embodiment will be described next with reference to FIGS. 9 to 11. FIG. 9 is a flowchart illustrating an analysis processing according to the first embodiment which is performed by the analyzing device 50. FIGS. 10 and 11 are diagrams illustrating the analysis processing according to the first embodiment.

At step S100, the receiving unit 51 receives (captures) data on the wired network NW1. In FIG. 10, DATA1 to DATA6 are sequentially transmitted from the server 10. The receiving unit 51 sequentially receives DATA1 to DATA6 on the wired network NW1.

At step S102, the analyzing unit 52 determines whether the received data is a TCP packet. If it is determined that the received data is not a TCP packet, the analyzing unit 52 determines that the received data is not target data, and then the sequence returns to the start. If it is determined that the received data is a TCP packet, the analyzing unit 52 determines that the received data is target data and classifies the target data for every connection at step S104. Hereinafter, respective processings are performed on the target data which is classified as the same connection.

At step S106, the storing unit 53 stores a reception time of the target data obtained by the analyzing unit 52 at step S106. At step S108, the analyzing unit 52 calculates an ACK interval of the ACK packet which is transmitted from a wireless terminal 20 when the wireless terminal 20 receives a DATA packet. The ACK interval is a time difference from the reception time of a previous ACK packet.

At S110, the analyzing unit 52 calculates the difference of the ACK intervals. The calculation of the difference of the ACK intervals will be described in detail below.

The transmitting speed of the wired section is, for example, approximately 100 Mbps and the transmitting speed of the wireless section is, for example, approximately 1 Mbps. Therefore, it takes time to load DATA1 to DATA6 transmitted from the server 10 in the wireless network NW2 to transmit DATA1 to DATA6 through the wired network NW1 after DATA1 to DATA6 arrive at the relay device 30. As a result, as illustrated in FIG. 10, the serialization delay S occurs until DATA1 to DATA6 are loaded in the wireless network NW2 to be transmitted after arriving at the relay device 30.

In the present embodiment, the wireless terminal 20 transmits one ACK packet when two DATA packets are received. When the ACK packet is received, the server 10 transmits subsequent two DATA packets. In FIG. 10, when DATA1 and DATA2 are received, the wireless terminal 20 transmits ACK2, and when DATA3 and DATA4 are received, the wireless terminal 20 transmits ACK4. When ACK2 is received, the server 10 transmits DATA7 and DATA8, and when ACK4 is received, the server 10 transmits DATA9 and DATA10. In this case, the analyzing unit 52 calculates the difference between reception timings of the previous ACK2 and the present ACK4, that is, an ACK interval 1. Similarly, the analyzing unit 52 calculates an ACK interval 2 between ACK4 and ACK6. The storing unit 53 stores the calculated ACK interval.

The ACK intervals 1 and 2 are represented by the following equation.

> ACK interval 1=reception timing of ACK4−reception timing of ACK2=serialization delay $S$ of DATA3+retransmission delay $R$ of DATA3+serialization delay $S$ of DATA4+retransmission delay $R$ of DATA4

> ACK interval 2=reception timing of ACK6−reception timing of ACK4=serialization delay $S$ of DATA5+retransmission delay $R$ of DATA5+serialization delay $S$ of DATA6+retransmission delay $R$ of DATA6

As illustrated in FIG. 10, when no retransmission delay occurs, if it is assumed that the serialization delays S of the DATA packets included in ACK intervals are the same, the difference between the ACK interval 1 and the ACK interval 2 is zero.

In the meantime, as illustrated in FIG. 11, when retransmission occurs two times at the ACK interval 1 and retransmission occurs five times at the ACK interval 2, if it is assumed that the serialization delays S of the data packets are the same, the difference between the ACK interval 1 and the ACK interval 2 is a value obtained by multiplying the number of retransmissions (i.e., three (3)) and the retransmission delay R.

Referring back to FIG. 9, after calculating the difference between the ACK intervals at step S110, the analyzing unit 52 adds a count value for every predetermined cycle based on the difference between the ACK intervals at step S112. The retransmitting cycle in the wireless communication has been already defined for every type of wireless line. For example, a retransmitting cycle of the long term evolution (LTE) is set to be 8 ms and a retransmitting cycle of the high-speed downlink packet access (HSDPA) is set to be 10 ms. Therefore, if the difference between the ACK intervals falls within a range of 10 ms×N (N is an integer of 1 or larger)±2 ms, the analyzing unit 52 determines that the retransmitting cycle indicates a retransmitting cycle of HSDPA and adds one to a count value of the HSDPA. If the difference between the ACK intervals falls within a range of 8 ms×N (N is an integer of 1 or larger)±1.6 ms, the analyzing unit 52 may determine that the retransmitting cycle indicates a retransmitting cycle of the LTE and add one to a count value of the LTE. The ranges for the retransmitting cycle of ±2 ms and ±1.6 ms is an example of a tolerable range (retransmitting cycle×0.2) which is determined to be equal to the retransmitting cycle and may be ±1 ms, ±0.8 ms (retransmitting cycle×0.1) or any other range.

For example, if the difference between the ACK intervals is a value within 10 ms×N±1 ms, the analyzing unit 52 may add one to the count value of the HSDPA, and if the difference between the ACK intervals is a value within 8 ms×N±0.8 ms, the analyzing unit 52 may add one to the count value of the LTE. By doing this, if it is determined that the target data is data included in a predetermined cycle (8 ms or 10 ms) based on the difference between ACK intervals for the target data which is classified as the same connection, the analyzing unit 52 adds the count value which is provided at every predetermined cycle.

Subsequently, at step S114, the analyzing unit 52 determines whether the retransmitting cycle is represented in the wireless communication based on the count value for every predetermined cycle. For example, if the count value of the LTE or the count value of the HSDPA with respect to the entire count number of the target data is 80% or higher, the analyzing unit 52 determines that there is a retransmitting cycle in the wireless communication.

When the retransmitting cycle of the wireless communication is confirmed by the above analysis, the analyzing unit 52 determines that a line type of the wireless network NW2 is a wireless line of this cycle at step S116. For example, if the count value of the HSDPA with respect to the entire count number of the target data is 80% or higher, the analyzing unit 52 determines that the line type of the wireless network NW2 is the HSDPA. If the count value of the LTE with respect to the entire count number of the target data is 80% or higher, the analyzing unit 52 determines that the line type of the wireless network NW2 is the LTE. If both the count value of the HSDPA and the count value of the LTE with respect to the entire count number of the target data are 80% or higher, the analyzing unit 52 determines that the line type of the wireless network NW2 is the line type having a larger count value. If both the count value of the HSDPA and the count value of the LTE with respect to the entire count number of the target data are equal to be 80% or higher, the analyzing unit 52 may determine that determination is impossible. However, in determining the line type, the ratio of the count value of the LTE with respect to the entire count number of the target data is not limited to 80%, but may be 90% or higher, or 70% or higher. Further, if it is determined that the retransmitting cycle is not confirmed, the sequence returns to the start.

[Example of Effect]

Figure 12:
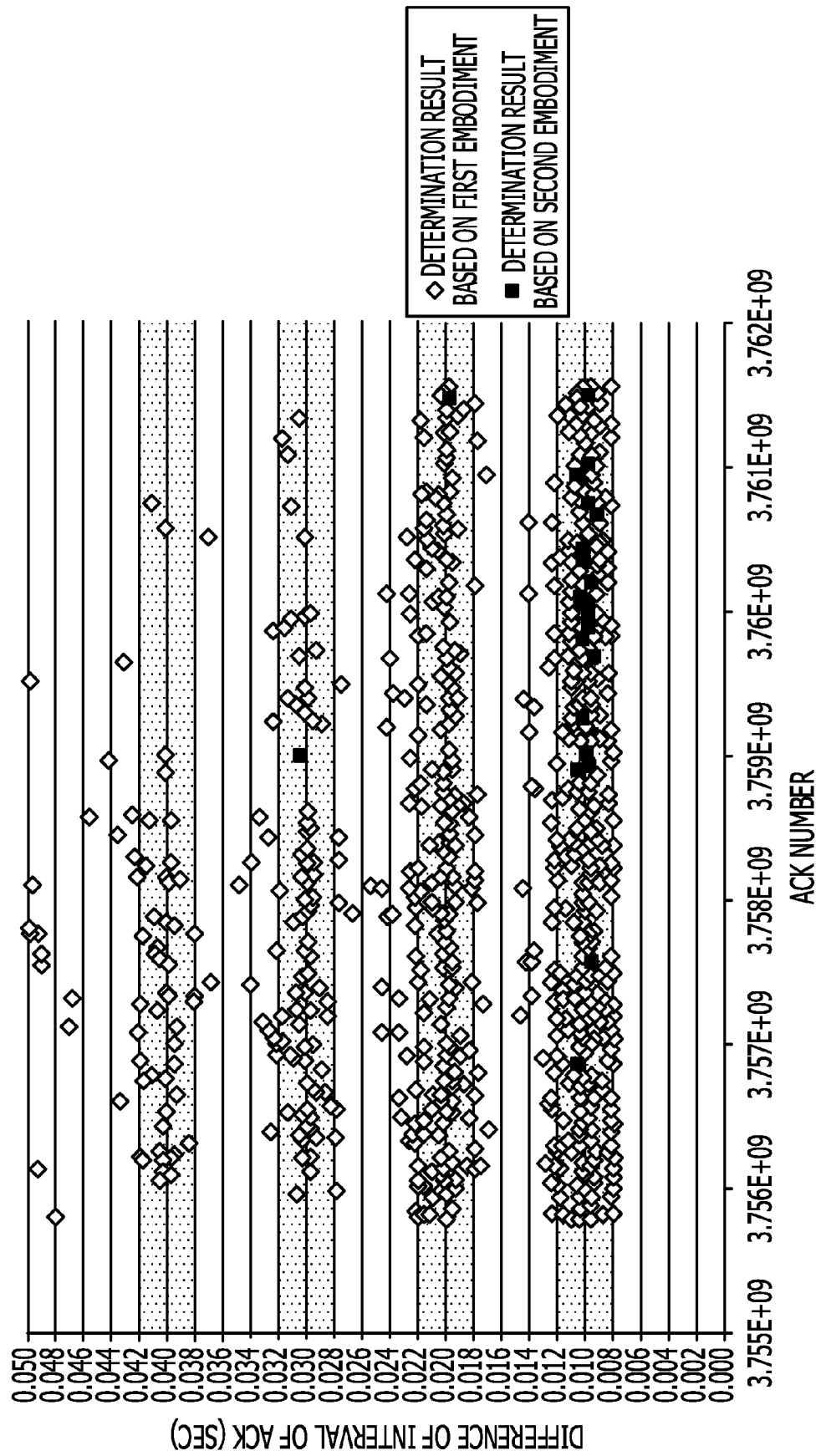
FIG. 12 is a diagram illustrating an example of an analysis result according to first and second embodiments.

FIG. 12 illustrates an example of an effect. In FIG. 12, the ACK number of the ACK packet which is calculated for the target data is represented on the horizontal axis, and the difference between the ACK intervals which is calculated from the ACK packet is represented on the vertical axis. A diamond mark indicates a calculated value of the present embodiment. According to this, 80% or more of the diamond mark is included in 10 ms×N±2 ms with respect to the entire counter number of the target data. Therefore, the analyzing unit 52 determines that the line type of the wireless network NW2 is the HSDPA.

As described above, the analyzing device 50 according to the present embodiment analyzes the data transmission in the wireless communication based on the data received in the wired section. Specifically, the difference between the ACK intervals is obtained based on the calculated value of the target data, and the retransmitting cycle in the wireless communication is analyzed by the difference. Further, the type of wireless line is determined based on the analysis result. By doing this, the difference between the ACK intervals is obtained so that the serialization delay S included in the ACK intervals is offset. By doing this, the accuracy of determining the type of wireless line is increased.

The analyzing device 50 according to the present embodiment may determine whether the quality of the wireless section is good or not. For example, when the speed of the wireless line is 5 Mbps, if the analyzing device 50 determines that the type of wireless line is the HSDPA, it may be determined that the line speed is reasonable and the communication quality in the wireless section is satisfactory. In contrast, even when a speed of the wireless line is 5 Mbps, if the analyzing device 50 determines that the type of wireless line is the LTE, it may be determined that the line speed is slow and the communication status in the wireless section is not satisfactory.

It is possible to clearly specify a line in which a failure is occurring by analyzing whether there is a retransmitting cycle of the wireless line. For example, when the failure occurs in the data communication, if it is analyzed that there is a retransmitting cycle of the wireless line, the analyzing device 50 may determine that the failure occurs not in the wired section but in the wireless section.

If the analyzing device is provided in the wireless section for every wireless terminal 20, the installation location of the analyzing device is restricted and the number of installed analyzing devices increases. However, the analyzing device 50 according to the present embodiment is not provided for the wireless section every wireless terminal 20 but provided in the wired section where wireless communications with a plurality of wireless terminals 20 are integrated. By doing this, data is easily received and the number of installed analyzing devices 50 is reduced, thereby reducing an overall cost.

Second Embodiment

The analyzing device 50 according to a second embodiment of the present disclosure will be described next. The analyzing device 50 according to the first embodiment analyzes the retransmitting cycle of the wireless communication on an assumption that all the serialization delays of data included in the ACK interval are the same. In contrast, the analyzing device 50 according to the second embodiment analyzes a retransmitting cycle of the wireless communication by considering that the serialization delays of data included in the ACK interval vary.

Figure 13:
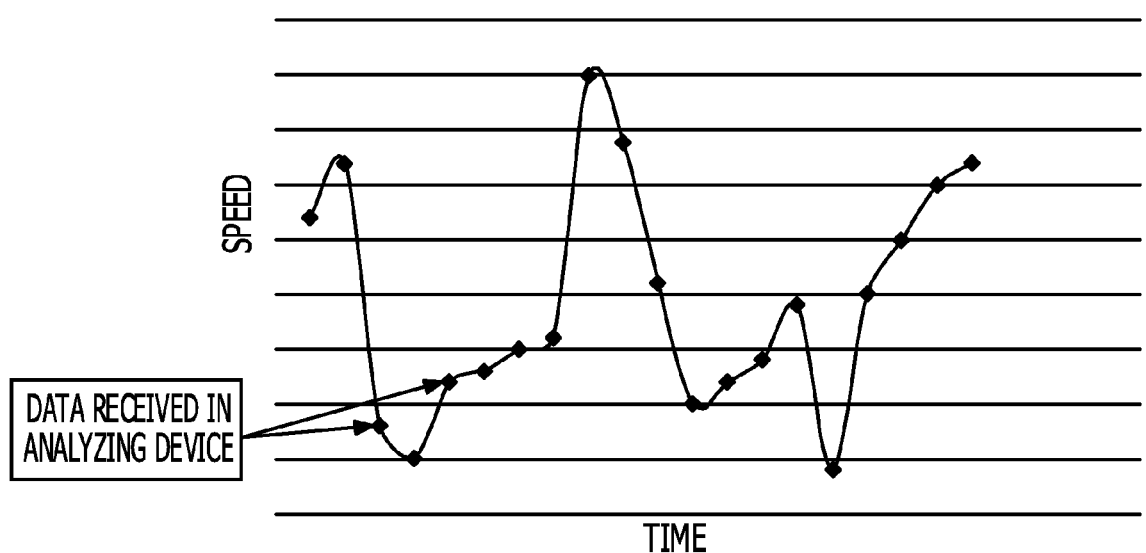
FIG. 13 is a diagram illustrating a data transmission situation of a wireless section.
Figure 14B:
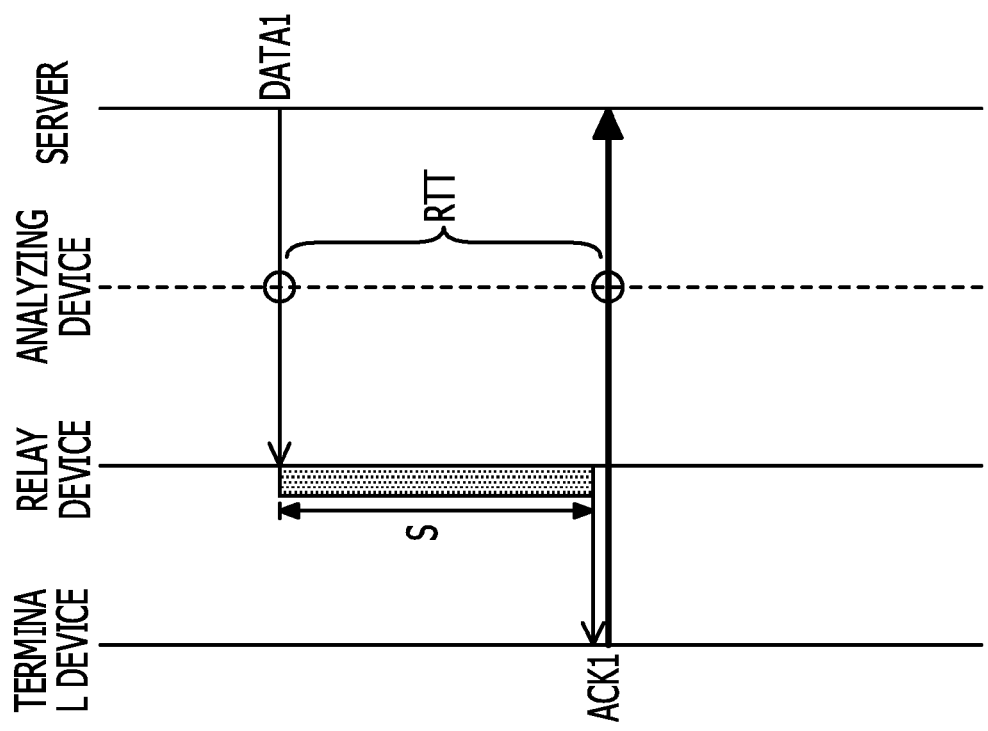
FIGS. 14A and 14B are diagrams illustrating a relationship between a line speed and RTT.
Figure 14A:
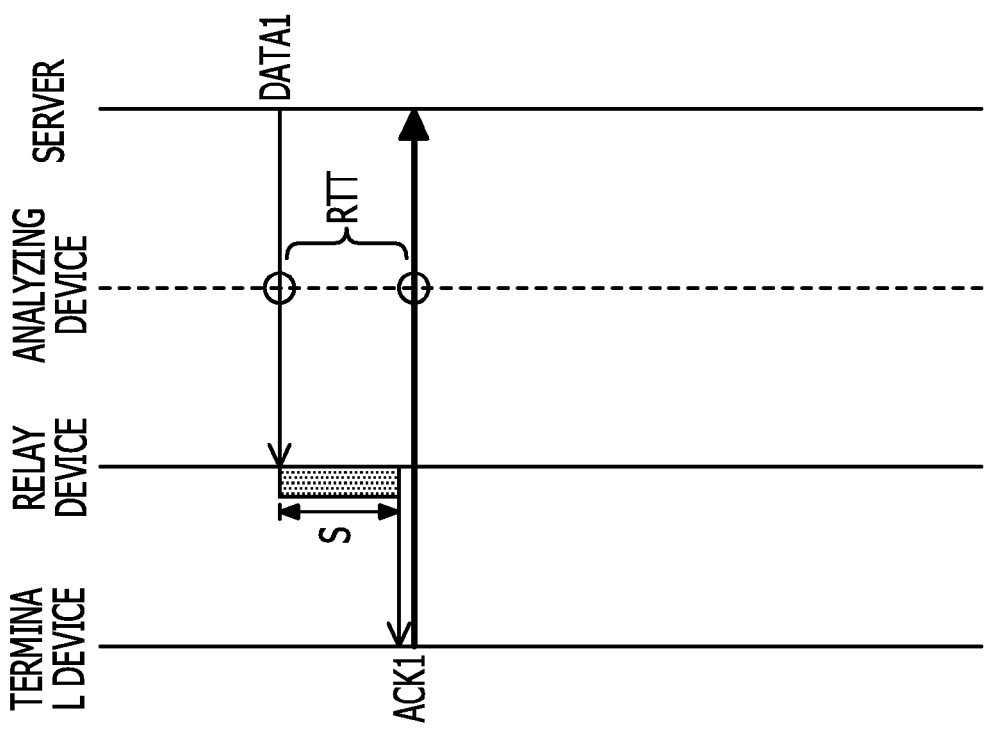

The analyzing device 50 does not know the variation of a line speed in a wireless section. However, as illustrated in FIG. 13, the line speed actually varies at a time when the analyzing device 50 receives data (TCP packet). When the data sizes are the same, the serialization delay is inversely proportional to the line speed as represented by the Equation (1). Therefore, when the line speed is relatively fast as illustrated in FIG. 14A, the serialization delay S is relatively short, and when the line relatively speed is slow as illustrated in FIG. 14B, the serialization delay S is relatively long. Therefore, it is understood that the serialization delay of data included in the ACK interval corresponding to the data received by the analyzing device 50 has different values in accordance with the line speed. Specifically, when the speed of the wireless line is relatively slow, the serialization delay becomes relatively larger but the serialization delay may not be offset only by obtaining the difference between the ACK intervals as described in the first embodiment, so that the retransmitting cycle of the wireless line may not be accurately analyzed in some cases.

The speed variation in the communication of the wireless section is larger than that in the communication of the wired section. Accordingly, in the case of the wireless line, the variation of the serialization delay due to the influence of the speed variation is larger than that in the wired section, and the determination accuracy of the type of wireless line may be lowered. Here, if the speed of the wireless line is stable, a round trip time (RTT) tends to be stable. The RTT refers to a time until the analyzing device 50 receives the ACK from the wireless terminal 20 for DATA1 after receiving DATA1. When the line speed is relatively fast as illustrated in FIG. 14A, the RTT becomes shorter and if the line speed is relatively slow as illustrated in FIG. 14B, the RTT becomes longer. Therefore, it is estimated that the variation of the speed is relatively small when the variation of the RTT is relatively small and data of which the RTT variation is relatively large is excluded from the analysis target. By doing this, the retransmitting cycle of the wireless communication is analyzed based on the difference between the ACK intervals of data of which the speed variation is relatively small, that is, the variation of the serialization delay is relatively small. The data of which the variation of the serialization delay is relatively large is excluded as a non-analysis target so that it is considered that the serialization delays of the data included in the ACK intervals are substantially the same. Therefore, the serialization delay is offset by the difference of the ACK intervals. By doing this, according to the present embodiment, the analysis is performed while significantly reducing the influence of the serialization delay so that the error is hardly included in the analysis of the retransmitting cycle and the accuracy of determining the type of wireless line is improved.

Hereinafter, the analyzing device 50 according to the second embodiment will be described. The functional configuration of the analyzing device 50 according to the second embodiment is the same as the functional configuration of the analyzing device 50 of FIG. 6 described in the first embodiment. However, the analyzing unit 52 of the second embodiment has the following functions.

The analyzing unit 52 calculates the RTT, that is, the time until the ACK packet is received from the wireless terminal 20 for the DATA packet after receiving the DATA packet.

In accordance with the variation of the time of the RTT, the analyzing unit 52 excludes a specific ACK packet among the received ACK packets from the analysis target and analyzes the retransmitting cycle in the wireless communication based on the difference of a plurality of ACK intervals which are not excluded.

[Operation of Analyzing Device]

Figure 16:
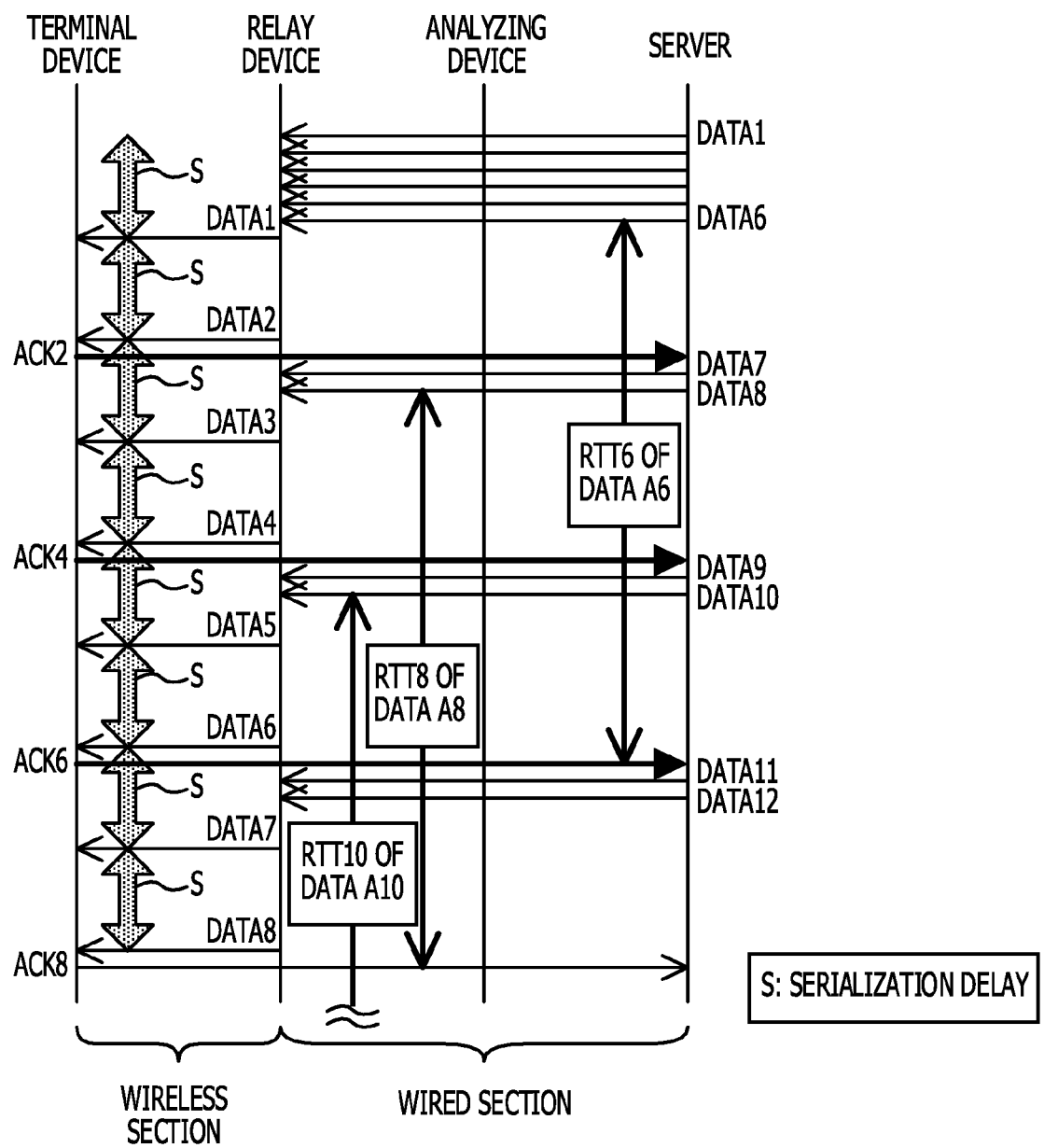
FIG. 16 is a diagram illustrating an analysis processing according to the second embodiment.

The operation of the analyzing device according to the second embodiment will be described with reference to FIGS. 15 to 17. FIG. 15 is a flowchart illustrating an analysis processing according to the second embodiment which is performed by the analyzing device 50. FIGS. 16 and 17 are diagrams illustrating the analysis processing according to the second embodiment.

At step S100, the receiving unit 51 receives (captures) data on a wired network NW1. In FIG. 16, DATA1 to DATA6 are sequentially transmitted from the server 10. The receiving unit 51 sequentially receives DATA1 to DATA6 on the wired network NW1.

At step S102, the analyzing unit 52 determines whether the received data is a TCP packet. If it is determined that the received data is not the TCP packet, the analyzing unit 52 determines that the received data is not target data and then the sequence returns to the start. If it is determined that the received data is the TCP packet, the analyzing unit 52 classifies the target data for every connection at step S104. Hereinafter, respective processings are performed on target data which is classified as the same connection.

Figure 17B:
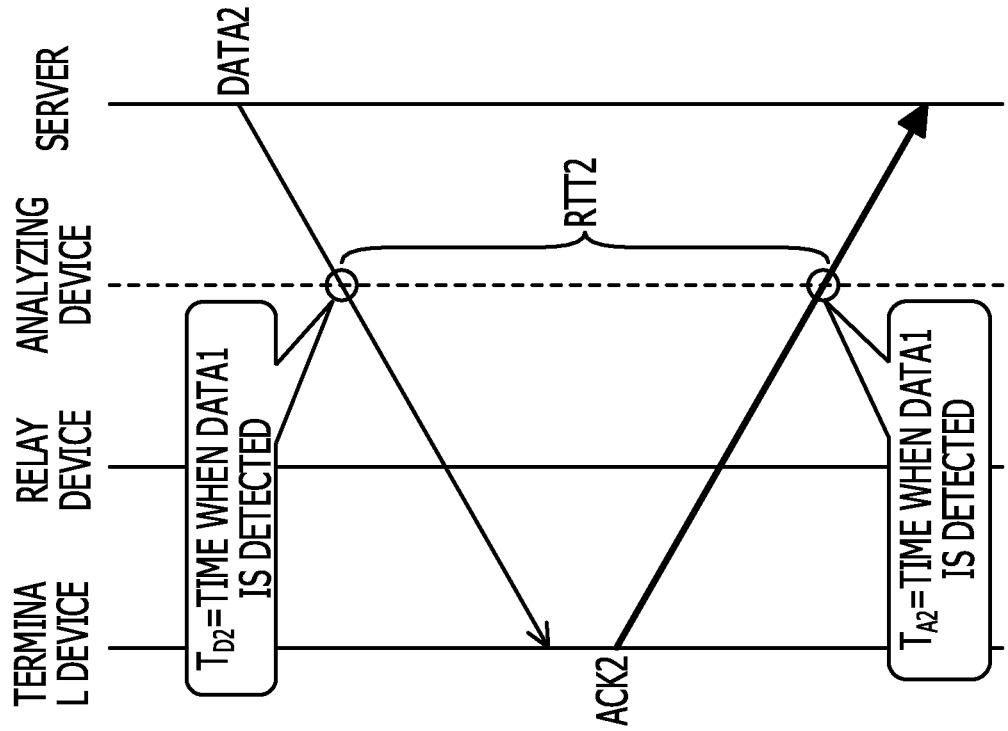
FIGS. 17A and 17B are diagrams illustrating a calculation example of RTT.
Figure 17A:
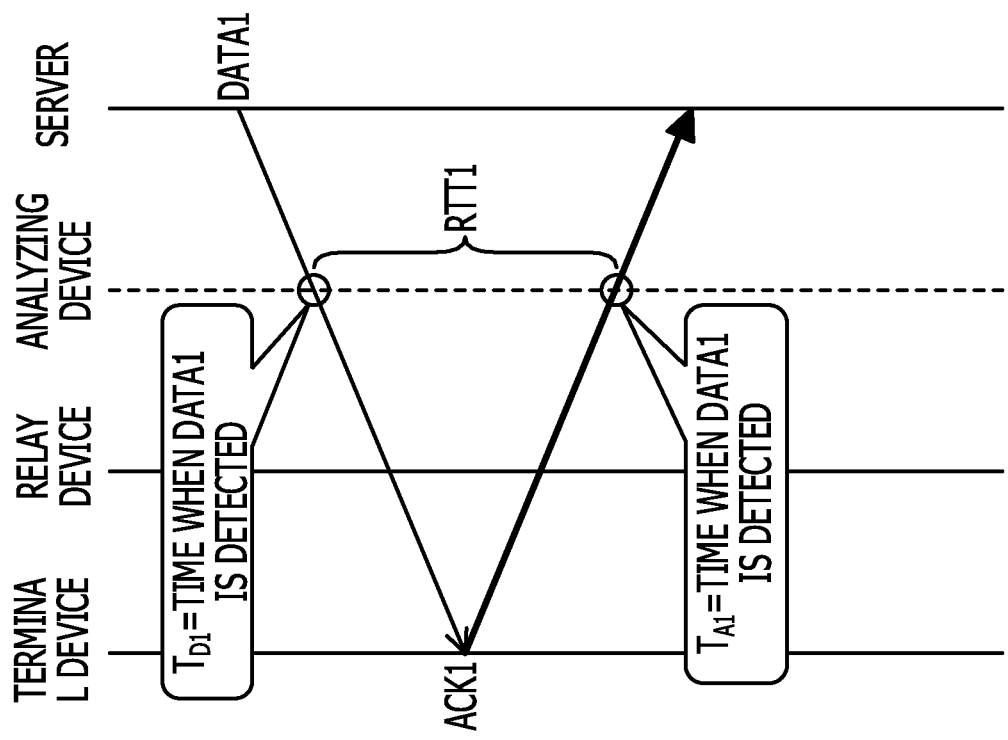

At step S106, the storing unit 53 stores a reception time of the target data obtained by the analyzing unit 52. At step S200, the analyzing unit 52 calculates the RTT of the data, that is, a time until the ACK packet is received from the wireless terminal 20 for the DATA packet after receiving the DATA packet. As illustrated in FIG. 17A, the analyzing unit 52 calculates RTT1=$(T_{A1}-T_{D1})$ which is the time from a reception time $T_{D1}$ of DATA1 to a reception time $T_{A1}$ of ACK1 which is an acknowledgement for DATA1. Similarly, as illustrated in FIG. 17B, the analyzing unit 52 calculates RTT2=$(T_{A2}-T_{D2})$ which is the time from a reception time $T_{D2}$ of DATA2 to a reception time $T_{A2}$ of ACK2 which is an acknowledgement for DATA2. By doing this, if the difference between the maximum value and the minimum value of the RTT of the ACK packet which is being processed currently, a first previous ACK packet, and a second previous ACK packet is 500 μs or larger, it is considered that the variation of the RTT is large.

For example, RTT6, RTT8, and RTT10 of corresponding DATA6, DATA8, and DATA10 of FIG. 16 are calculated for DATA10 which is being currently processed. Here, even though the retransmission delay R is not illustrated in FIG. 16, it is considered that the calculated RTT includes not only the serialization delay S but also the retransmission delay R.

At step S202, the analyzing unit 52 determines whether a value obtained by subtracting the minimum value from the maximum value of adjacent three RTTs is smaller than 500 μs. For example, if it is determined that the value obtained by subtracting the minimum value from the maximum value of RTT6, RTT8, and RTT10 is equal to or larger than 500 μs, DATA10 is determined to be a non-analysis target and the sequence returns to the start. In the meantime, if it is determined that the value obtained by subtracting the minimum value from the maximum value of RTT6, RTT8, and RTT10 is smaller than 500 μs, the analyzing unit 52 calculates the ACK intervals of corresponding DATA6, DATA8, and DATA10 at step S108.

At step S110, the analyzing unit 52 calculates the difference of the ACK intervals. Since it has been determined at step S202 that the value obtained by subtracting the minimum value from the maximum value of the RTT is smaller than 500 μs, the serialization delays S of the data included in each ACK interval have the same or similar values. Accordingly, the serialization delays S of the data included in the ACK intervals are more surely compensated by the difference of the ACK intervals, and the calculated value is a value obtained by multiplying the number of retransmissions and the retransmission delay R.

At step S112, the analyzing unit 52 adds a count value for every predetermined cycle based on the calculated difference of the ACK intervals. At step S114, the analyzing unit 52 determines whether the retransmitting cycle is presented in the wireless communication based on the count value for every predetermined cycle. For example, if the count value of the LTE or the count value of the HSDPA with respect to all the count numbers of the target data is 80% or more, the analyzing unit 52 determines that there is a retransmitting cycle in the wireless communication.

When the retransmitting cycle of the wireless communication is confirmed by the above analysis, the analyzing unit 52 determines that the line type of the wireless network NW2 is a wireless line of this cycle at step S116. For example, if the count value of the HSDPA with respect to the entire count number of the target data is 80% or higher, the analyzing unit 52 determines that the line type of the wireless network NW2 is the HSDPA. If the count value of the LTE with respect to the entire count number of the target data is 80% or higher, the analyzing unit 52 determines that the line type of the wireless network NW2 is the LTE. Further, if it is determined that the retransmitting cycle is not confirmed, the sequence returns to the start.

[Example of Effect]

FIG. 12 illustrates an example of an effect. In FIG. 12, a square mark represents a calculated value of the second embodiment. According to this, it is understood that all square marks of the target data are included in 10 ms×N±2 ms, and there is no variation of the analysis result and the analysis accuracy of the retransmitting cycle is improved as compared with the analysis result of the first embodiment (diamond mark). The analyzing unit 52 determines that the type of wireless line is the HSDPA.

As described above, the analyzing device 50 according to the second embodiment obtains the difference of the ACK intervals of the data, analyzes the retransmission cycle in the wireless communication by the difference, and determines the type of wireless line based on the analysis result. In this case, if the variation of the RTT of the data corresponding to three adjacent ACK packets is larger than a predetermined threshold value, the analyzing unit 52 of the second embodiment excludes the ACK packet of the data from the analysis target and analyzes the retransmission cycle in the wireless communication based on the difference of the plurality of ACK intervals which are not excluded. As described above, when the variation of the RTT is relatively small, the analyzing device 50 of the second embodiment estimates that the variation of the serialization delay is small and analyzes the retransmission cycle of the wireless communication only on data of which the RTT variation is smaller than the predetermined threshold value. The above-described analysis is performed to more surely compensate the serialization delay of the data by the difference of the ACK interval so that an error component included when analyzing the retransmission cycle may be further reduced. As a result, the accuracy of determining the type of wireless line may be further improved.

First Modified Embodiment

In the first and second embodiments, the analyzing unit 52 analyzes the retransmission cycle in the wireless communication based on the difference of the adjacent (neighboring) ACK intervals among the calculated ACK intervals. However, the analyzing method is not limited thereto, but the analyzing unit 52 may analyze the retransmission cycle in the wireless communication based on at least any one of the difference of adjacent ACK intervals and the difference of proximate ACK intervals among the calculated ACK intervals. In FIG. 10, the difference of adjacent ACK intervals refers to a difference of neighboring ACK intervals among the ACK intervals, such as, for example, a difference between an ACK interval (ACK interval 1) between ACK 4 and ACK 2, and an ACK interval (ACK interval 2) between ACK 6 and ACK 4. The difference of the proximate ACK intervals refers to a difference of the ACK intervals which do not neighbor each other but are proximate, among the ACK intervals, such as, for example, a difference between an ACK interval (ACK interval 1) between ACK 4 and ACK 2, and an ACK interval (ACK interval 3) between ACK 8 and ACK 6. The proximate ACK intervals may use an ACK interval which is distant by one to plural intervals. Further, the analyzing unit 52 may analyze the retransmission cycle in the wireless communication based on a plurality of differences of ACK intervals in which a difference of adjacent ACK intervals and a difference of proximate ACK intervals are mixed.

Second Modified Embodiment

In the second embodiment, the analyzing unit 52 excludes data in which the variation of the RTT is larger than the predetermined threshold value from the analysis target in accordance with the variation of the RTT of three adjacent data. However, the analyzing method is not limited thereto, but the analyzing unit 52 may exclude the data in which the variation of the RTT is larger than the predetermined threshold value from the analysis target in accordance with the variation of the RTT of the data corresponding to the plurality of proximate ACK packets. One or plural distant RTTs may be used as the RTT of the data corresponding to the plurality of proximate ACK packets. Further, the analyzing unit 52 may exclude data in which the variation of the RTT is larger than the predetermined threshold value from the analysis target in accordance with the variation of the RTT of the data corresponding to the plurality of ACK packets which is at least adjacent or proximate. In the second embodiment, the analyzing unit 52 compares the difference of the maximum value and the minimum value of three RTTs with the threshold value to calculate the variation of the RTT, but the present disclosure is not limited thereto, and the analyzing unit 52 may compare the difference of two RTTs with the threshold value or compare a difference of the maximum value and the minimum value of four or more RTTs with the threshold value. Further, the predetermined threshold value is not limited to 500 μs but may be appropriately determined depending on the type of wireless line.

As described above, the analyzing device 1 according to the first and second embodiments may analyze the data transmission in the wireless communication based on the data received in the wired section. Further, the analyzing device may determine the type of wireless line based on the retransmitting cycle of the wireless line obtained as an analysis result.

[Example of Hardware Configuration]

Figure 18:
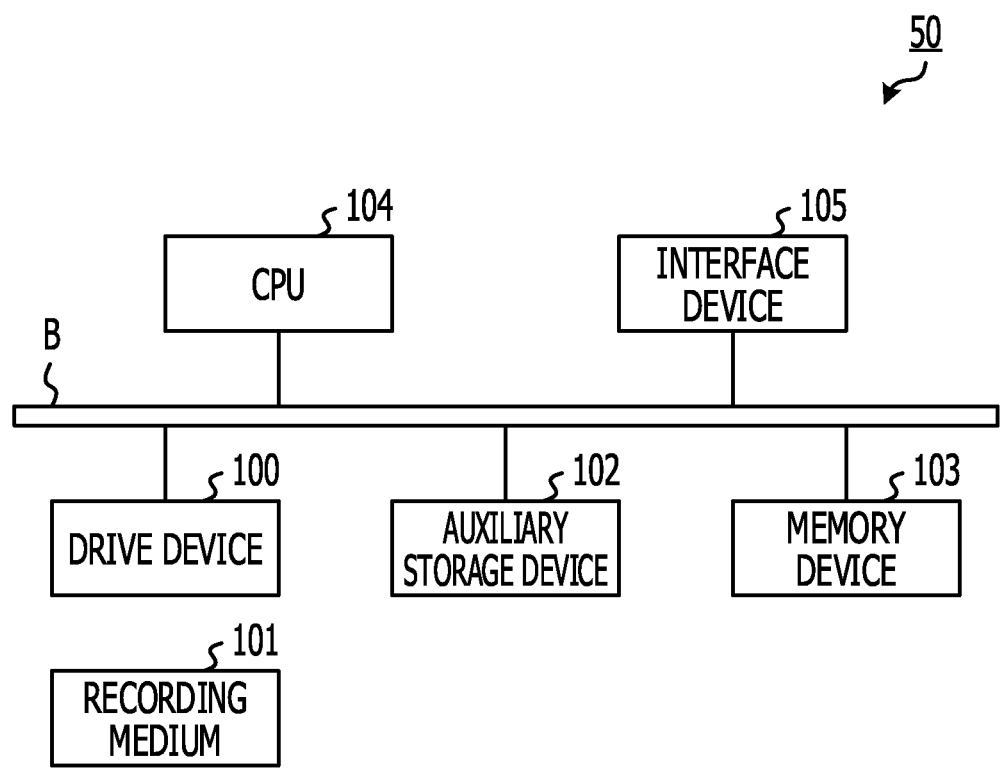
FIG. 18 is a diagram illustrating an example of a hardware configuration of an analyzing device according to first and second embodiments.

The hardware configuration of the analyzing device according to the embodiment will be described with reference to FIG. 18. FIG. 18 is a diagram illustrating an example of the hardware configuration of the analyzing device according to an embodiment. The analyzing device 50 includes a drive device 100, an auxiliary storage device 102, a memory device 103, a central processing unit (CPU) 104, and an interface device 105, and each of which is coupled to a bus B, respectively.

A program which implements the processing in the analyzing device 50 is provided with a recording medium 101. When the recording medium 101 in which a program is recorded is set in the drive device 100, the program is installed from the recording medium 101 into the auxiliary storage device 102 through, for example, the drive device 100. However the program is not necessarily installed from the recording medium 101 but may be downloaded from another computer through a network. The auxiliary storage device 102 stores the installed program and a necessary file or data.

If there is an instruction to run the program, the memory device 103 reads out and stores the program from the auxiliary storage device 102. The CPU 104 executes the program stored in the memory device 103 to serve as the analyzing device 50. The interface device 105 is used as an interface for accessing the wired network NW1 which is branched by the TAP 40.

A display device such as a liquid crystal display which displays a monitoring result, or an input device such as a mouse or a keyboard which accepts the input of the monitoring instruction may be coupled to the analyzing device 50. The analyzing device 50 may be manipulated by a computer through the network and in this case, the computer may include the display device or the input device.

Examples of the recording medium 101 may include a portable recording medium such as a CD-ROM, a DVD disk, or an USB memory. Further, an example of the auxiliary storage device 102 includes a hard disk drive (HDD) or a flash memory. In any of the recording medium 101 and the auxiliary storage device 102, each of the receiving unit 51 and the analyzing unit 52 corresponding to a computer readable recording medium is implemented by the processing executed by the CPU 104 by the program stored in the memory device 103. For example, the auxiliary storage device 102 or the memory device 103 may be used as the storing unit 53 or the storing unit 53 may be implemented using a storage device which is coupled to the analyzing device 50 through the wired network NW1 using the memory device 103 or the interface device 105.

The analyzing device, the analyzing method, and the analyzing program have been described above by the embodiments, but the present disclosure is not limited to the embodiments, and various modifications and changes may be made within the scope of the present disclosure. Further, the first and second embodiments may be combined within a range in which the first and second embodiments do not conflict with each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An analyzing device coupled to a wired network, the wired network coupling an information processing device and a relay device to each other, the information processing device transmitting a plurality of data to the relay device, the relay device relaying the plurality of data to a wireless communication device by wireless communication, the analyzing device comprising:

a memory and a processor coupled to the memory and configured to:

capture, on the wired network, a plurality of acknowledgments from the wireless communication device to the information processing device for the plurality of data, the relay device being configured to retransmit data to the wireless communication device at a first interval when the wireless communication device fails to receive any one of the plurality of data, calculate a reception interval of the plurality of acknowledgements, specify the first interval based on a variation of the calculated reception interval of the plurality of acknowledgements, and transmit the specified first interval to at least one of a display device coupled to the analyzing device and a computer coupled to the analyzing device.

2. The analyzing device according to claim 1, wherein the processor is configured to determine a type of communication standard which is used for the wireless communication based on the first interval.

3. The analyzing device according to claim 1, wherein the processor is configured to:

receive the plurality of data in the wired network, calculate times until the plurality of acknowledgements for the plurality of data are received from the wireless communication device after receiving the plurality of data for every data, and exclude a specific acknowledgement from the plurality of acknowledgements based on the times calculated for every data, specify the first interval based on a variation of the reception intervals of the remained acknowledgements.

4. The analyzing device according to claim 1, wherein the processor is configured to:

classify the plurality of acknowledgements into a plurality of groups based on connection, and specify the communication standard of each of the groups.

5. An analyzing method comprising:

capturing, by an analyzing device, in a wired network, a plurality of acknowledgements from a wireless communication device to an information processing device for a plurality of data, with data bring retransmitted to the wireless communication device at a first interval when the wireless communication device fails to receive any one of the plurality of data;

calculating a reception interval of the captured plurality of acknowledgements;

specifying the first interval based on a variation of the calculated reception interval of the plurality of acknowledgements calculated at the calculating; and transmitting the specified first interval to at least one of a display device coupled to the analyzing device and a computer coupled to the analyzing device.

6. The analyzing method according to claim 5, further comprising:

determining a type of communication standard which is used for the wireless communication, based on the first interval.

7. The analyzing method according to claim 5, wherein the capturing includes receiving the plurality of data in the wired network, the calculating includes calculating times until the plurality of acknowledgements for the plurality of data are received from the wireless communication device after the plurality of data are received, for every data, and the specifying includes specifying the first interval based on a variation of the reception intervals of the received acknowledgements.

8. The analyzing method according to claim 7, wherein the specifying includes classifying the plurality of acknowledgements into a plurality of groups based on connection; and specifying the communication standard of each of the groups.

9. A non-transitory recording medium in which a program including at least a process executed by a computer is recorded, the process comprising:

capturing, the analyzing device in a wired network, a plurality of acknowledgements from a wireless communication device to an information processing device for a plurality of data, with data being retransmitted to the with data being retransmitted to the wireless communication device at a first interval when the wireless communication device fails to receive any one of the plurality of data;

calculating a reception interval of the captured plurality of acknowledgements;

specifying the first interval based on a variation of the calculated reception interval of the plurality of acknowledgements calculated at the calculating; and transmitting the specified first interval to at least one of a display device coupled to the analyzing device and a computer coupled to the analyzing device.

10. The non-transitory recording medium according to claim 9, wherein the process further includes determining a type of communication standard which is used for the wireless communication, based on the first interval.

11. The non-transitory recording medium according to claim 9, wherein the capturing includes receiving the plurality of data in the wired network, the calculating includes calculating times until the plurality of acknowledgements for the plurality of data are received from the wireless communication device after the plurality of data are received for every data, and the specifying includes specifying the first interval based on a variation of the reception intervals of the remaining acknowledgements.

12. The non-transitory recording medium according to claim 9, wherein the specifying includes analyzing the retransmission cycle in the wireless communication based on at least one of a difference of adjacent reception intervals of acknowledgements and a difference classifying the plurality of acknowledgements into a plurality of groups based on connection; and specifying the communication standard of each of the groups.

* * * * *